(12) United States Patent
Hannon et al.

(10) Patent No.: US 9,892,757 B2
(45) Date of Patent: Feb. 13, 2018

(54) APPARATUS AND METHOD FOR CALCULATING AND VIRTUALLY DISPLAYING FOOTBALL STATISTICS

(71) Applicants: Devin F. Hannon, Bethesda, MD (US); Shane M. Hannon, Bethesda, MD (US); Meaghan Hannon, Bethesda, MD (US); Maura Reilly Hannon, Bethesda, MD (US)

(72) Inventors: Devin F. Hannon, Bethesda, MD (US); Shane M. Hannon, Bethesda, MD (US); Meaghan Hannon, Bethesda, MD (US); Maura Reilly Hannon, Bethesda, MD (US)

( * ) Notice: Subject to any disclaimer, the term of this patent is extended or adjusted under 35 U.S.C. 154(b) by 186 days.

(21) Appl. No.: 14/524,427

(22) Filed: Oct. 27, 2014

(65) Prior Publication Data
US 2016/0118084 A1    Apr. 28, 2016

(51) Int. Cl.
| | | |
|---|---|---|
| *H04N 21/81* | (2011.01) | |
| *H04N 21/4728* | (2011.01) | |
| *H04N 21/218* | (2011.01) | |
| *H04N 21/2187* | (2011.01) | |
| *H04N 21/2389* | (2011.01) | |
| *G11B 27/036* | (2006.01) | |

(52) U.S. Cl.
CPC ....... *G11B 27/036* (2013.01); *H04N 21/2187* (2013.01); *H04N 21/21805* (2013.01); *H04N 21/23892* (2013.01); *H04N 21/4728* (2013.01); *H04N 21/8133* (2013.01); *H04N 21/8146* (2013.01)

(58) Field of Classification Search
None
See application file for complete search history.

(56) References Cited

U.S. PATENT DOCUMENTS

| 6,536,041 B1 * | 3/2003 | Knudson | H04N 21/235 375/E7.024 |
|---|---|---|---|
| 8,358,345 B1 * | 1/2013 | Fiore | H04N 5/76 348/157 |
| 9,266,017 B1 * | 2/2016 | Parker | A63F 13/65 |
| 2002/0075407 A1 * | 6/2002 | Cohen-Solal | H04N 5/45 348/565 |
| 2009/0062941 A1 * | 3/2009 | Biniak | A63B 24/0062 700/91 |
| 2009/0262137 A1 * | 10/2009 | Walker | H04H 60/04 345/629 |
| 2010/0014825 A1 * | 1/2010 | Curtis | G11B 27/10 386/248 |
| 2011/0013087 A1 * | 1/2011 | House | A63B 24/0021 348/564 |
| 2013/0283311 A1 * | 10/2013 | Eyer | H04N 21/8133 725/32 |
| 2015/0248918 A1 * | 9/2015 | Tang | G06F 3/04842 715/719 |
| 2015/0382076 A1 * | 12/2015 | Davisson | H04H 20/04 725/62 |

* cited by examiner

*Primary Examiner* — Michael Telan
(74) *Attorney, Agent, or Firm* — Sughrue Mion, PLLC

(57) ABSTRACT

An apparatus for virtually applying graphical enhancements including a video enhancement processor receiving at least one image frame of a football game extracted from a multimedia stream. The at least one image frame includes a plurality of players. The apparatus applies a graphical enhancement to the at least one image frame such that at least one of the players is graphically enhanced.

23 Claims, 14 Drawing Sheets

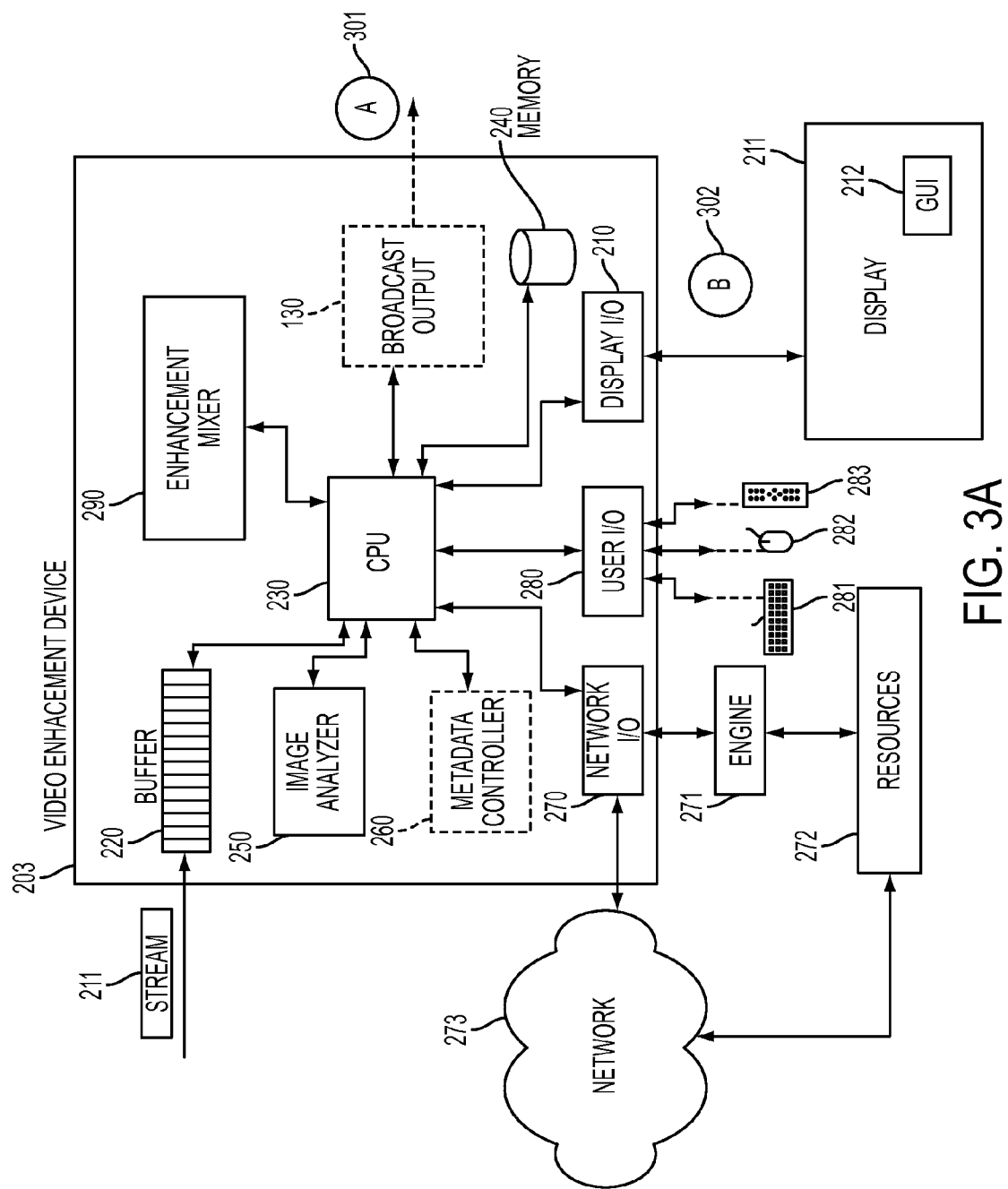

APPARATUS AND METHOD FOR CALCULATING AND VIRTUALLY DISPLAYING FOOTBALL STATISTICS

BACKGROUND

1. Field

The present disclosure broadly relates to the fields of graphical interfaces and display of video contents.

2. Description of the Related Art

The description of the related art provided herein is for the purpose of generally presenting the context of the disclosure. Work of the presently named inventor, to the extent it is described in the background section, as well as aspects of the description that may not otherwise qualify as prior art at the time of filing, are neither expressly nor impliedly admitted as prior art against the present disclosure.

Today, there are many technological advances which improve a user's experience of watching sports. For example, a live video stream of a sports game may be enhanced by various graphical insertions. For example, in American Football, hereinafter "football," it is common for a live stream of the football game to be enhanced by virtually inserting a $1^{st}$ and Ten line, indicating a first down marker. This virtual enhancement is only visible to those viewing the displayed video content and is not visible to those watching the game without the use of a display, such as a television, receiving the stream of the football game.

Further, it is common to provide a player ranking scheme by compiling, averaging, and or otherwise analyzing player performance metrics. For example, an offensive football player's statistics may include any of passing yards, rushing yards, and receiving yards.

The term "passing yards" refers to a statistic measuring the total distance gained by the offensive team when a successful pass is made from the passing player to the receiving player. The passing yards metric refers to the player who passes the football.

The term "rushing yards" refers to a statistic measuring the total distance gained the offensive team when a player is able to carry the football. The rushing yards metric refers to the player who carries the football.

The term "receiving yards" refers to a statistic measuring the total distance gained by the offensive team when a receiving player receives the football. The receiving yards metric refers to the player who receives the football.

Although a first down marker may be shown, it is not known in the art to virtually display player statistics, as described herein.

SUMMARY

According to an aspect of exemplary embodiments an apparatus for virtually applying graphical enhancements comprises a video enhancement processor configured to receive at least one image frame of a football game extracted from a multimedia stream, wherein the at least one image frame comprises a plurality of players, and configured to apply a graphical enhancement to the at least one image frame such that at least one of the players is graphically enhanced.

According to an aspect of exemplary embodiments, the apparatus comprises at least one indicator showing a distance which the one player is projected to advance a line of scrimmage and is further configured to apply the graphical enhancement according to an average of at least one of the one player's passing yards, rushing yards, and receiving yards.

According to an aspect of exemplary embodiments, the video enhancement processor is further configured to apply the graphical enhancement so as to display a bar indicator above said one player, and the bar is perpendicular to the line of scrimmage and comprises information about the distance.

According to an aspect of exemplary embodiments, the video enhancement processor further comprises a user interface configured to receive user input comprising at least one command which selects said one player and also comprises a metadata controller configured to analyze metadata, indicating the graphical enhancement, determine a predetermined instruction to modify the graphical enhancement, and control the video enhancement device to modify the graphical enhancement.

According to an aspect of exemplary embodiments, the video enhancement processor further comprises a receiver configured to receive a broadcast comprising said at least one frame, from a broadcaster and wherein the broadcast is provided with the graphical enhancement to a plurality of display devices.

According to an aspect of exemplary embodiments an apparatus for virtually applying graphical enhancements, comprises a memory storing a plurality of software instructions to provide graphical enhancements; and a processor configured to execute the plurality of software instructions comprising receiving at least one frame of a football game extracted from a multimedia stream, wherein the at least one frame comprises a view of the football game with a plurality of players with at least one graphical enhancement, modifying the at least one graphical enhancement to generate a new graphical enhancement based on progress in the football game, applying the generated new graphical enhancement to the at least one player in the at least one frame; and outputting the at least one frame with the applied new graphical enhancement, According to an aspect of exemplary embodiments, wherein the pre-existing graphical enhancement and the new graphical enhancement, each are a prediction of a distance which the one player is projected to advance a line of scrimmage.

According to an aspect of exemplary embodiments, the video enhancement processor further comprises a user interface configured to receive user input comprising at least one command which modifies the pre-existing graphical enhancement and is further configured to modify the graphical enhancement according to a predetermined instruction.

According to an aspect of exemplary embodiments, the video enhancement processor further comprises an image analyzer configured to analyze the one frame of the video to identify and to modify the pre-existing graphical enhancement according to the predetermined instruction, and the video enhancement processor further comprises a metadata controller configured to analyze metadata, indicating the pre-existing graphical enhancement, and to control the video enhancement processor to modify the pre-existing graphical enhancement according to the predetermined instruction.

BRIEF DESCRIPTION OF THE DRAWINGS

Certain aspects will become more apparent by describing in detail illustrative, non-limiting embodiments thereof with reference to the accompanying drawings, in which like reference numerals refer to like elements in the drawings.

FIG. 3A illustrates a video enhancement device which receives and processes a video stream of a sporting event, such as a football game.

DETAILED DESCRIPTION OF EXEMPLARY EMBODIMENTS

Figure 1:
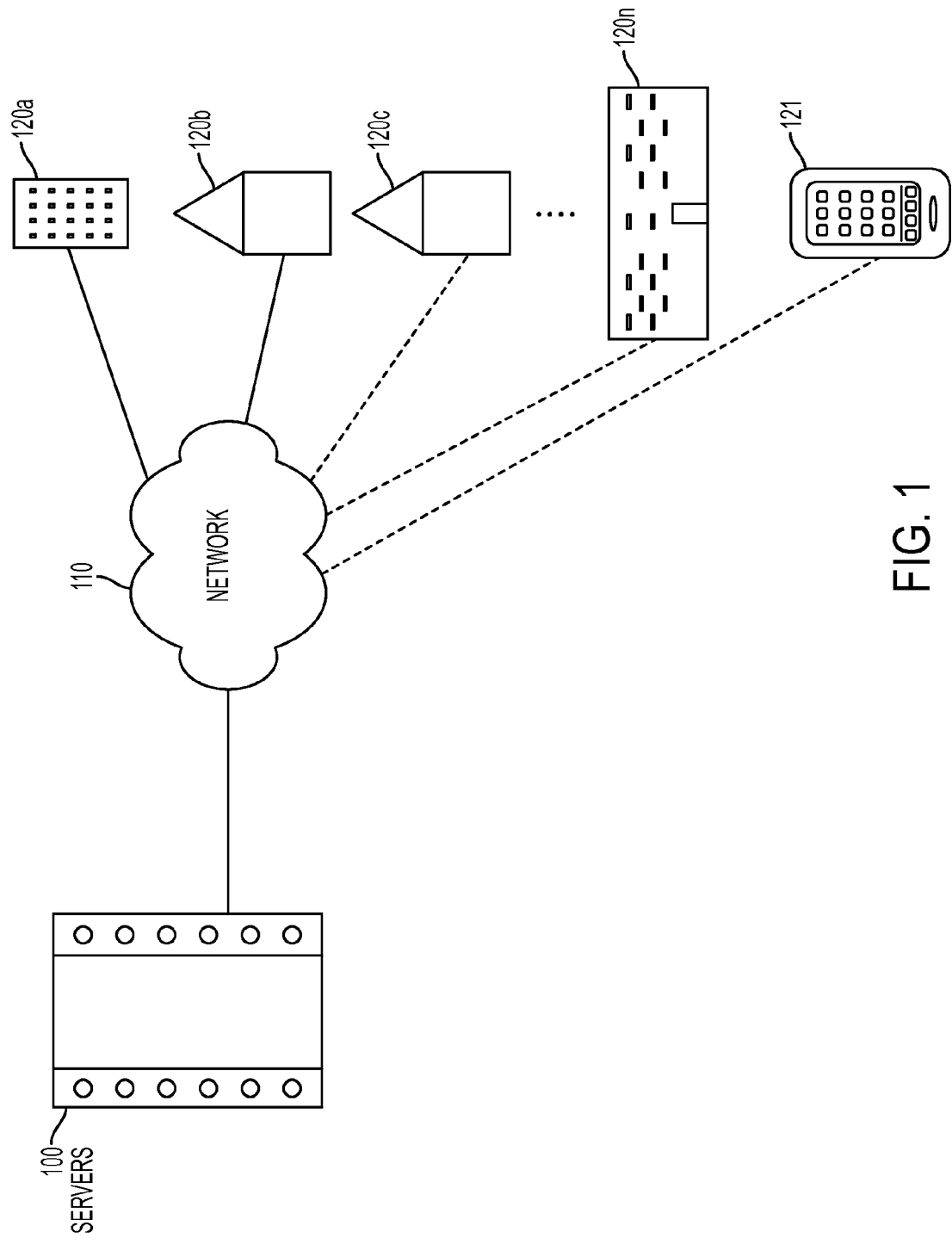
FIG. 1 is a highly simplified illustrative of an exemplary system for providing video enhancements according to an exemplary embodiment.

In the following detailed description of exemplary embodiments, reference will be made to the accompanying drawings, in which analogous functional elements are designated with same numerals. The aforementioned accompanying drawings show by way of illustration and not by way of limitation to further the understanding of exemplary embodiments. These exemplary embodiments are described in sufficient detail to enable those skilled in the art to practice the inventive concept and it is to be understood that other implementations may be utilized and that structural changes and/or substitutions of various elements may be made without departing from the scope and spirit of inventive concept. The following detailed description of exemplary embodiments is, therefore, not to be construed in a limiting sense. Additionally, the various exemplary embodiments as described may be implemented in the form of software running on a general purpose computer, in the form of a specialized hardware, or a combination of software and hardware.

In exemplary, non-limiting embodiments, a specially programmed computer is programmed to perform a specific algorithm. The specially programmed computer provides a video enhancement to video broadcasting systems such as a system broadcasting a televised football game. The specially programmed computer may be implemented as a stand-alone device that connects to a set top box (STB) to provide enhancements to a live stream or a video on demand received via the STB. It is further possible to manufacture a new STB that would add the enhancements to a live stream. Due to the processing power and speed required to performed the enhancements, it may be beneficial to have a separate stand-alone device that processes the live stream or the video stream and adds the enhancements thereon. In a specific algorithm described in an exemplary embodiment, the processing speed of the stand-alone video enhancement device, or video enhancement processor, is improved due to the nature of processing, e.g., selective processing, as described in greater detail below. Furthermore, in a specific algorithm described in an exemplary embodiment, memory usage is further minimized by performing the enhancements on the fly without requiring extra storage capacity. Also, since the selective processing is employed, memory usage is minimized, as explained below in greater detail. In addition, new user interfaces are provided that provides for a new display of a sports game e.g., a football game. Accordingly, exemplary embodiments are directed to a new device, which is specifically programmed to implement an algorithm of video enhancements. The functioning of this device is further improved via increased processing speed, lower memory requirements than in related art techniques, and a new user interface displayed via a display device such as a television or a computer display. Exemplary, non-limiting embodiments may enhance video streams in any video providing systems. Some examples of the various systems in which video enhancements are computed include video broadcasting systems for televised football games. Video enhancements may be used in the context of providing additional information to viewers of the televised or otherwise displayed football game.

FIG. 1 is a view illustrating an exemplary system for providing video enhancements according to an exemplary embodiment. As shown in FIG. 1, servers 100 provide contents to users. For example, the servers 100 may be servers of various broadcast stations that provide contents stored in various databases (not shown) to homes. Also, the servers 100 may transmit a received live broadcast to various homes 120a, . . . 120n via a network 110. The network 110 may include an Internet network. The network 110 may include fiber optic cables where contents are transmitted from the servers 100 via hubs to various user home devices 120a, . . . 102n and mobile device 121. In each user home, a set top box (STB) may be provided in addition to other elements according to an exemplary embodiment.

Figure 2A:
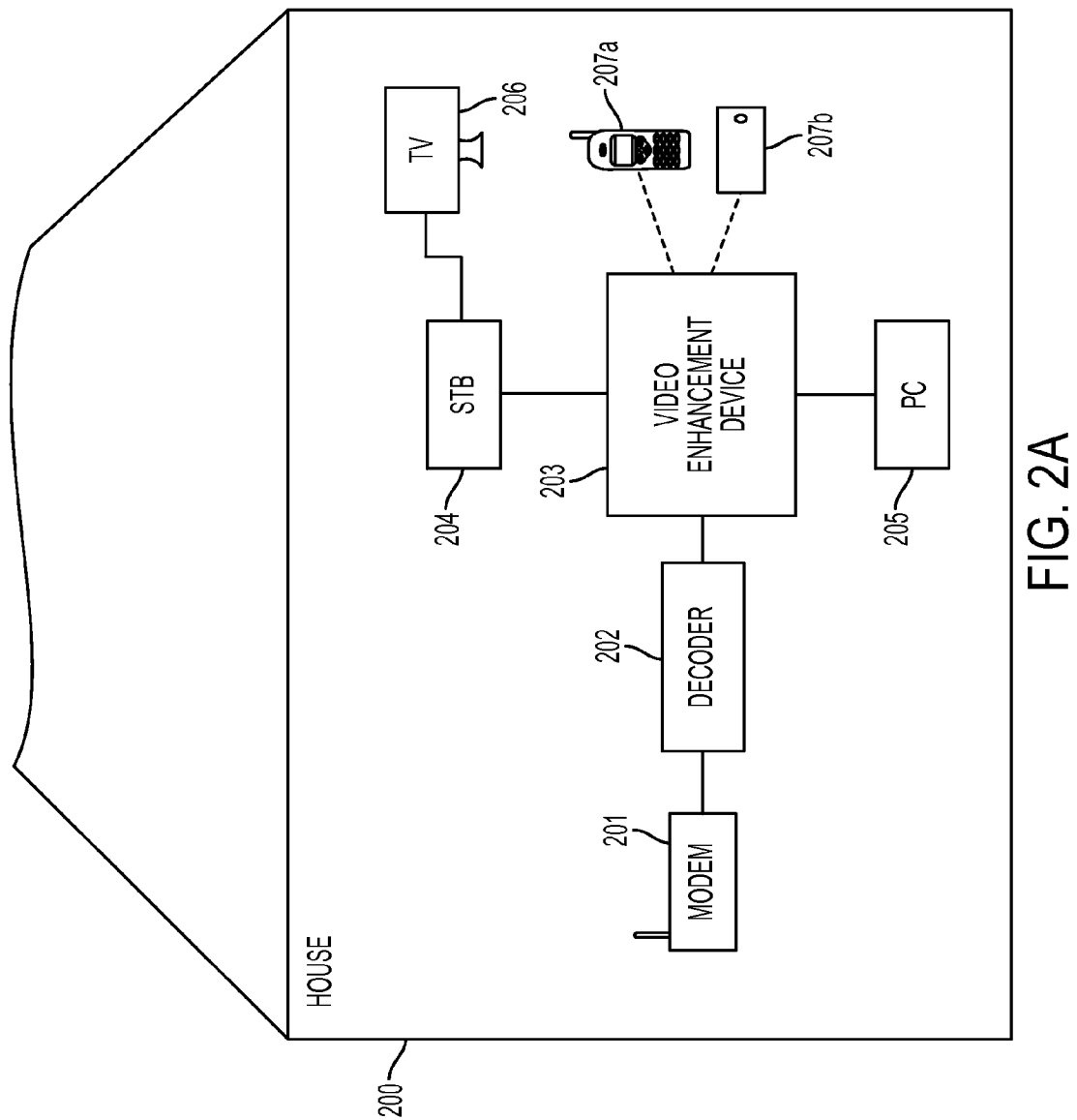
FIG. 2A is a highly simplified illustrative drawing showing a receiver of the video contents transmitted via a network according to an exemplary embodiment.

FIG. 2A is a highly simplified illustrative drawing showing a receiver of the video contents transmitted via a network according to an exemplary embodiment.

As shown in FIG. 2A, the house 200 may include one or more antennas 201 to receive the video contents from a network. For example, a modem may be an antenna 201 that receives the content such as a DSL modem, a cable modem, or the like. The received contents may be decoded by a decoder 202. Once decoded, the contents are provided to the video enhancement device 203, described below. The video enhancement device modifies the live stream or video contents based on user instructions or predetermined settings and continuously outputs the modified stream to one of the user devices such as a STB 204 and/or a personal computer (PC) 205 and/or a personal device such as an iPad 207a or a mobile telephone 207b. The STB 204 may be connected to one or more TVs 206, which display the received modified stream on a display.

Figure 2B:
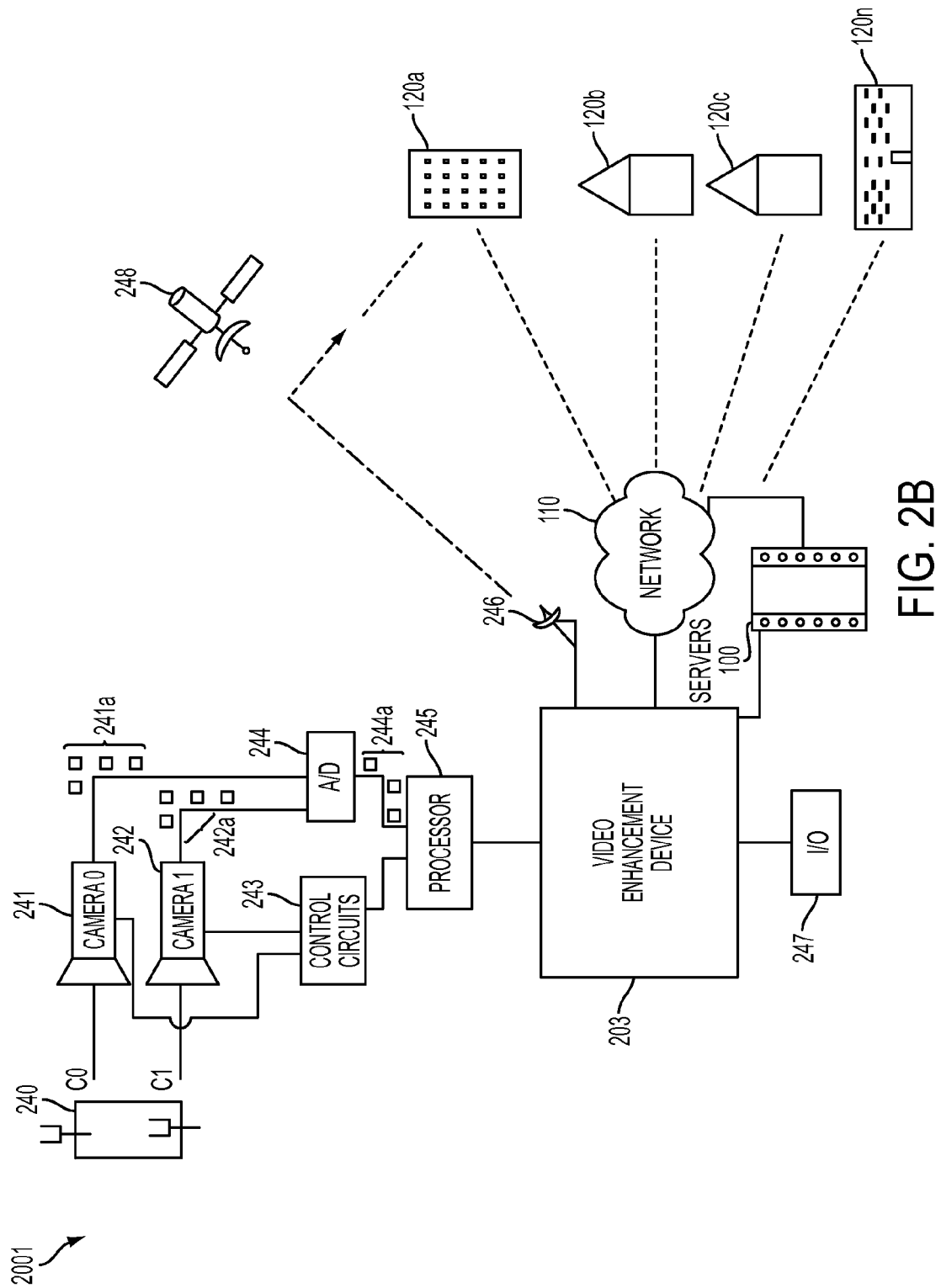
FIG. 2B is a highly simplified illustrative drawing showing a receiver of the video contents transmitted from a camera according to an exemplary embodiment.

FIG. 2B is a highly simplified illustrative drawing showing a receiver of the video contents transmitted from a camera according to an exemplary embodiment.

As shown in FIG. 2B, the system 2001 includes a football field 240, a camera 241, a camera 242, a video enhancement device 203, a network 110, and various home devices 120a, . . . 120n.

A processor 245 controls the camera 241 and camera 242 via the control circuits 243, and the camera 241 and camera 242 capture various views of the football field 240.

Each of the views of the football field 240 include a stream of frames, such as frames 241a and frames 242a. According to exemplary embodiments, each stream includes a view of a football game, which includes various offensive and defensive players, field marks on football field 240 and other elements such as advertisements and people in the stands.

The camera 241 and camera 242 transmit an analog input video stream to the A/D converter 244 so that analog input may be converted into a digital output 244a.

The digital output 244a is provided to the video enhancement device 203 so that various video enhancements may be applied to the football game.

A user, such as a sports broadcast controller, by input, via FUI, keyboard, mouse, . . . etc., various selections and settings to be applied to the football game, as will be described in further detail with respect to the other figures. The settings may be predetermined or preconfigured such that enhancements are applied to the football game under specified conditions.

The video enhancement device 203 transmits the enhanced video stream via a transmitter 246 or network 110. The servers and home devices 120a . . . 120n are also configured as discussed with respect to the embodiments of FIG. 1. The transmitter 246 is in communication with a satellite 248. The satellite 248 may send satellite transmissions to homes 120a . . . 120n.

Figure 2C:
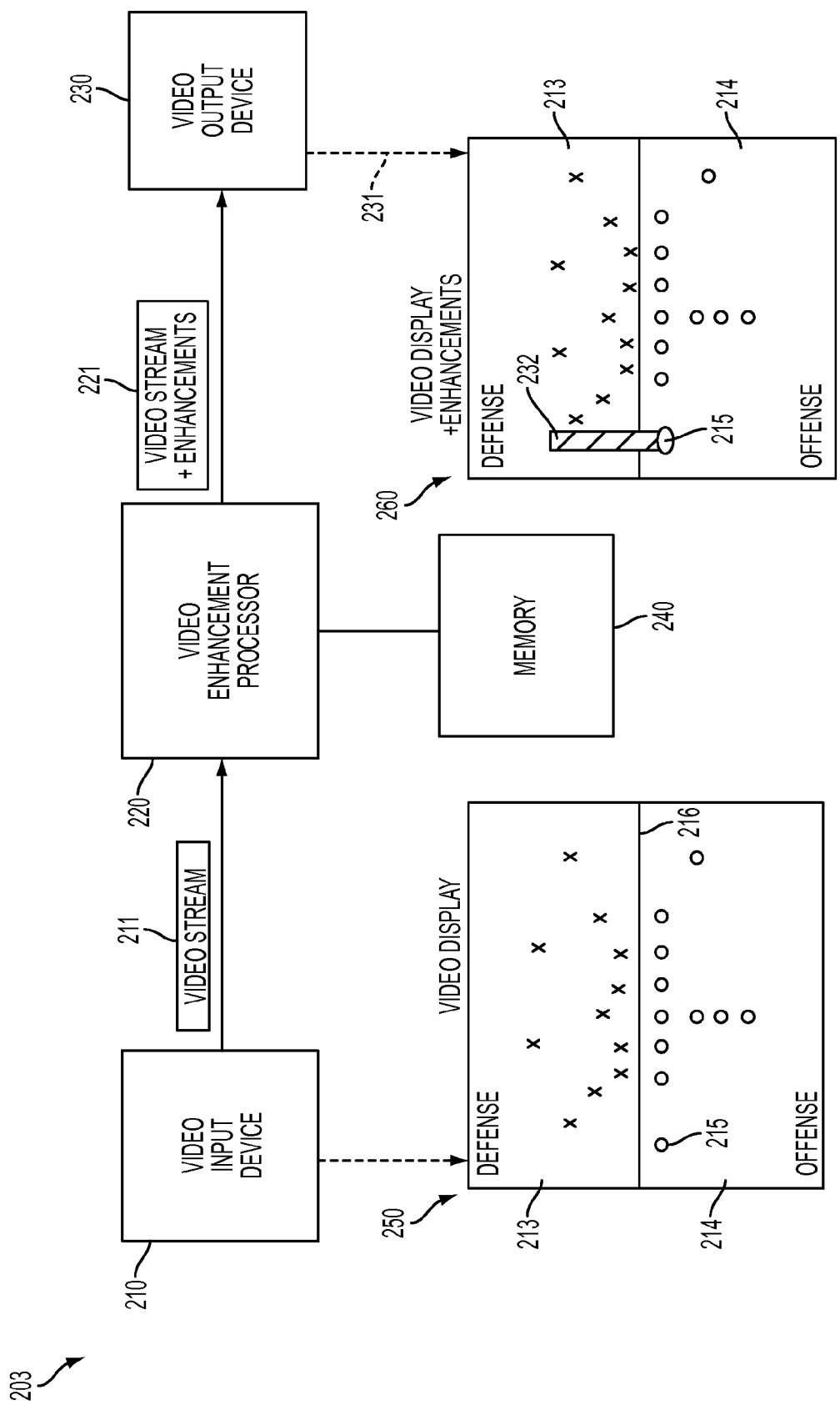
FIG. 2C is a highly simplified drawings of a video enhancement device.

FIG. 2C is a highly simplified drawings of a video enhancement device. Returning to FIG. 2C, the video enhancement processor 220 is configured to receive the video stream 211 and apply various graphical enhancements, as explained with reference to FIG. 2D and in greater detail below, to the frames of the video stream 211. The video enhancement processor 220 is also configured to transmit these enhancements with the enhanced video stream 221 in any format recognized by the art.

When the video enhancement device 203 is located at a broadcaster side, such as a television channel coordinator, the video enhancement device 203 may broadcast the enhanced video stream 221 to various customers, such as those watching a televised football game on a television at houses 102a . . . 102n.

When the video enhancement device 203 is located at a home, as in the exemplary embodiment of FIG. 2A, the video stream may be modified at the home.

If the video enhancement device 203 receives a video stream which already includes enhancements, the 203 may either remove the enhancements, such as by delayering or reprocessing or may further modify the enhancements, based on some predefined settings or additional user input.

According to an example embodiment, the 203 at a home may receive metadata corresponding to the already included enhancements. In such a case, the video enhancement device 203 may update the metadata by accessing preconfigured settings or by receiving additional user input, such as via a remote controller or GUI, as described further by the exemplary embodiments of FIG. 3A.

In the case that the already included enhancement is hard coded, such that the video stream is received by the video enhancement device 203 without any metadata to identify the enhancements, the video enhancement device 203 may reprocess the video stream to remove or otherwise alter the enhancement. For example, since the enhancement illustrated by FIG. 2C is a bar running perpendicular to the line of scrimmage 216, the video enhancement device 203 at the user's home may identify the enhancement by identifying a bar perpendicular to the line of scrimmage 216.

Additionally, if the already encoded enhancement is a red bar, the 203 at the home may have a preconfigured setting to change the color or shading level of the enhancement. For example, the video enhancement device 203 will change a red bar to an orange bar with a higher transparency. It will be understood that these are merely exemplary embodiments and the video enhancement device 203 at a home may perform other processing to modify an already added enhancement. It will be understood that when referring to a video enhancement device 203 at a home, this device may also be at a mobile device, which either processes the enhancements at the mobile device, or utilizes network processing capabilities.

According to an exemplary embodiment, the video input device 210 receives a video stream 211. A display of at least one frame of the video stream of FIG. 2C is illustrated by display 250, where each "X" symbol represents a respective player of the defensive team 213, and each "O" symbol represents a respective player of the offensive team. For example, a player 215 has or will be selected upon which enhancements will be virtually inserted, transmitted, and displayed.

Figure 2D:
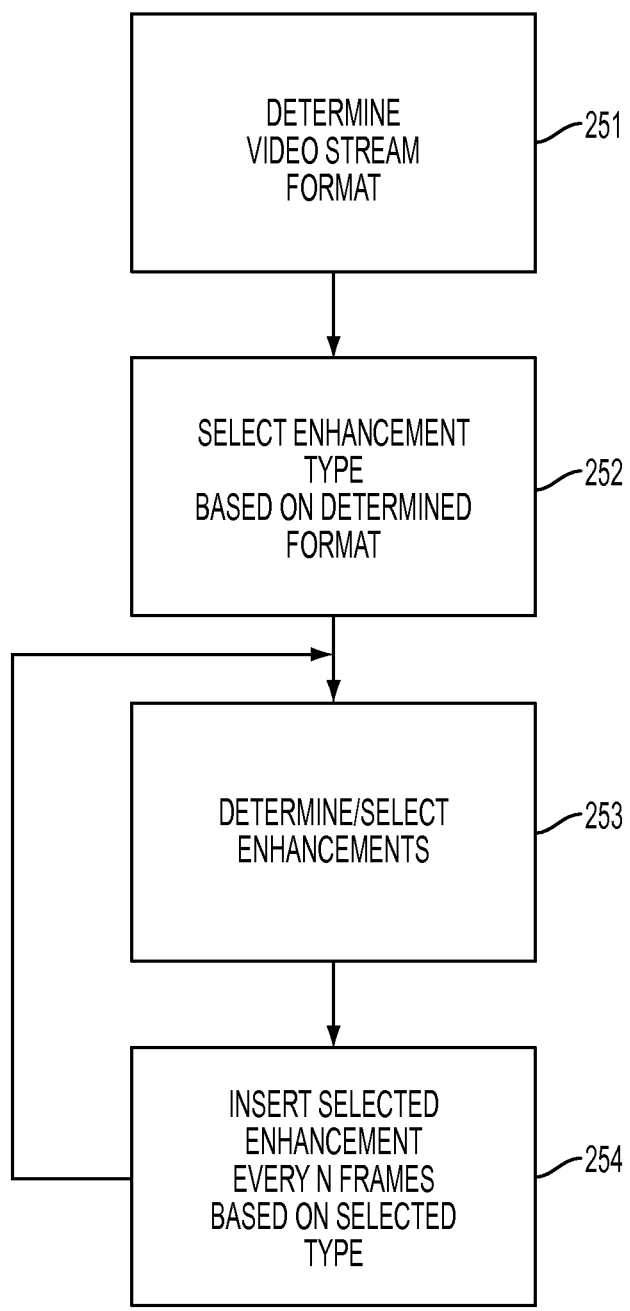
FIG. 2D is a flow chart illustrating video enhancement process according to an exemplary embodiment.

FIG. 2D is a flow chart illustrating video enhancement process according to an exemplary embodiment.

As shown in FIG. 2D, the video enhancement processor receives a video stream and in operation 251, determines the format of the video stream. For example, the processor determines if the video stream is a live feed or a pre-recorded stream. If the video stream is a live stream, processing needs to be performed quickly as opposed to a pre-recorded stream where delays are possible. The processor determines if the streaming is an HTTP live streaming such as H.264 streaming (H.264) and the format of the media such as MPEG-2, MPEG-4, Adobe Flash, RealMedia, Windows Media, and so on.

In operation 252, based on the determined video stream format, the enhancement type is selected. For example, enhancement may be inserted every n number of frames, where n is a positive number 1 or greater. Specifically, n is selected as follows:

$$[N] = (w\%\text{codecs rate} + w\%\text{bandwidth rate} + W\%\text{data rate} + W\%\text{frame rate} + W\%\text{resolution})/T, \text{ where:}$$

w %—weight assigned to a respective variable, which may be preset or predetermined by the system to vary importance of various variables.

Codecs rate—format of the vide stream, where MPEG -4, for example, is assigned a rate of 4, as opposed to MPEG -2 which is assigned a rate of 2.

Bandwidth—connection speed, where 6 megabits or higher may be assigned a 5 rate, between 3 and 6 megabits maybe assigned a 4 rate, and so on.

Data Rate—size of the video file per second of data such that higher data rate is assigned a higher rate as opposed to a lower data rate. The lower the data rate, the more the video is compressed, the more quality is lost. This may have a higher weight because of its importance.

Frame rate—the higher the frame rate, the higher the rate assigned. For example, 30 frames per second (fps) may be assigned a rate of 5, between 30 and 25, a rate of 4, and so on.

T is a preset threshold value such that if a rate is based on a 5-1 scale, the threshold may be 5. Accordingly, if the quality of the video is high, it may be sufficient to insert the enhancement every five frames or so. On the other hand, if the quality is poor, the enhancement may need to be inserted in each frame i.e., n will be small.

In an exemplary embodiment, in operation 252, an enhancement type is selected such as insert every frame, every other frame, skip every two frames, skip every three frames, and so on. In an exemplary embodiment, the maximum enhancement type is skipping 4 frames to avoid visible deterioration in visibility of enhancements.

Next, in operation 253, types of enhancements to add are retrieved from memory 240 (shown in FIG. 2B). That is, in an exemplary embodiment, the memory may store various enhancements for various different sports games. An exemplary embodiment of which is explained in greater detail below. The user may input his or her selection of enhancements to be applied via a remote control on a television or using a keyboard, a mouse of a personal device, and a graphical user interface (GUI) for example. User selection is stored in a memory 240, which then applies the selected type of enhancement to nth frame in operation 254.

FIG. 3A illustrates a video enhancement device which receives and processes a video stream of a sporting event, such as a football game.

The video enhancement device 203 includes a buffer 220, an image analyzer 250, an enhancement mixer 250, a metadata controller 260, a display I/O 210, a user I/O 280, a network I/O 270, and a broadcast output 130.

The buffer 220 is configured to buffer the video stream 211 while enahcnements are prepared and applied.

The image analyzer 250 is configured to determine characteristics of the images contained within the video stream 211. The image analyzer may determine a position of a player by any of metadata, user input, or by some other identifier such as from the video stream, such as optical recognition including an optical character recognition (OCR) of a uniform number worn by one of the players.

The CPU 230 is configured to check a memory 240 for any predetermined settings. The predetermined settings are discussed with respect to the exemplary embodiments of FIG. 3B. The settings determined by the CPU 230 provide instructions for the image analyzer 250 such that the image analyzer analyzes less than an entire video stream and less than all of the players or possible enhancements and therefore lightens the processing load by reducing the amount of elements to be analyzed from the video stream 211.

The CPU 230 is also configured to receive instructions for enhancing the video stream from any of the memory 240, network I/O 270, user I/O 280, and display I/O 210.

The memory 240 may store a predetermined setting such as illustrated by the following pseudocode

---

When (Player X is on the field) {
    Display (enhancement for Player X)};
When (Player X is not on the field AND Player Y is on the field){
    Display(enhancement for Player Y)};
When (Player X is on the field AND Player Y is on the field){
    Display(enhancement for Player X)};
When (Quarter Back is on the field){
    Display(enhancement for Quarter Back)};
Etc.

---

It will be understood that these are merely exemplary embodiments and any combination of setting may be set, preconfigured, and/or stored.

The user I/O 280 is configured such that a user, via a keyboard 281, mouse 282, remote controller 283, . . . etc., may select a player, in either real-time or on a play-back. The user I/O 280 may convey an instruction to the image analyzer 250 to find some player by any available metric. The user I/O 280 may convey an instruction to display statistics for a user via a mouse click, from mouse 282 at a position corresponding to a position of a player illustrated on the display, typing a player's name or uniform number, or via a scrolling operation input by the remote controller 283.

The user I/O 210 is configured such that a user may input, via GUI 212, a selection of a user displayed on the display 211. The display 211 may be a display of a smart TV, tablet PC, and a smart phone, such that a user, viewing the display, may select a player to be enhanced. According to exemplary embodiments, the processing requirements of the enhancement device is decreased by using a user input of the position of the desired player, such as by circling, clicking, or gesturing the position of the player via either the user I/O 280 or the display I/O 210.

The network I/O is configured such that the video enhancement device 203 is capable of accessing information about the enhancements via network 273 and engine 271.

According to an exemplary embodiment, the enhancement to be added to a player is a metric of a number of yards that the player is likely to advance the line of scrimmage. The metric may be on a game-by-game, seasonal, lifetime, or other measure.

Such metrics may be stored in a memory 240 or may be accessible as a resource 270, such as a table, accessible via an engine 271 or network 273.

In the case that the video enhancement device 203 is at the broadcaster-side, a user may input, by any means, a metric other than those described above.

Figure 3B:
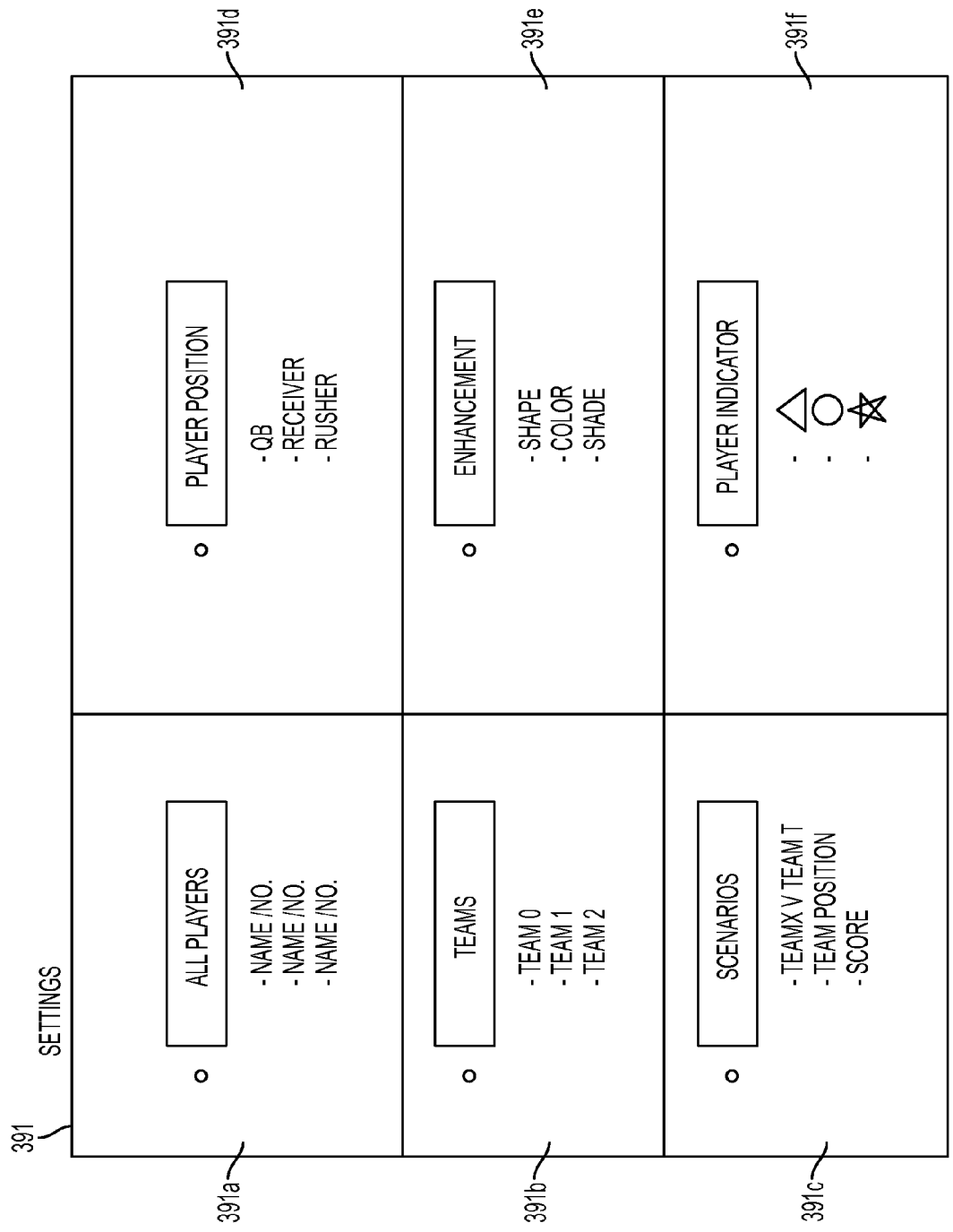
FIG. 3B illustrates a graphical user interface of configurable settings according to exemplary embodiments.
Figure 3C:
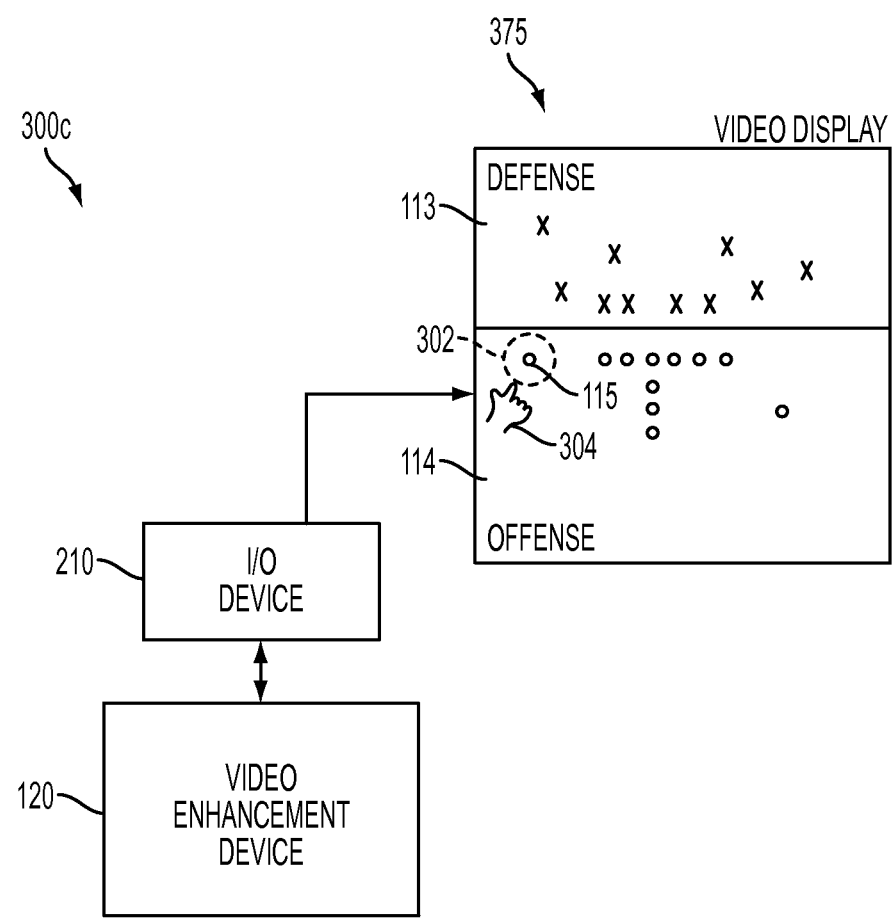
FIG. 3C is a highly simplified illustrative drawing showing a video enhancement device configured and operative according to exemplary embodiments.
Figure 3D:
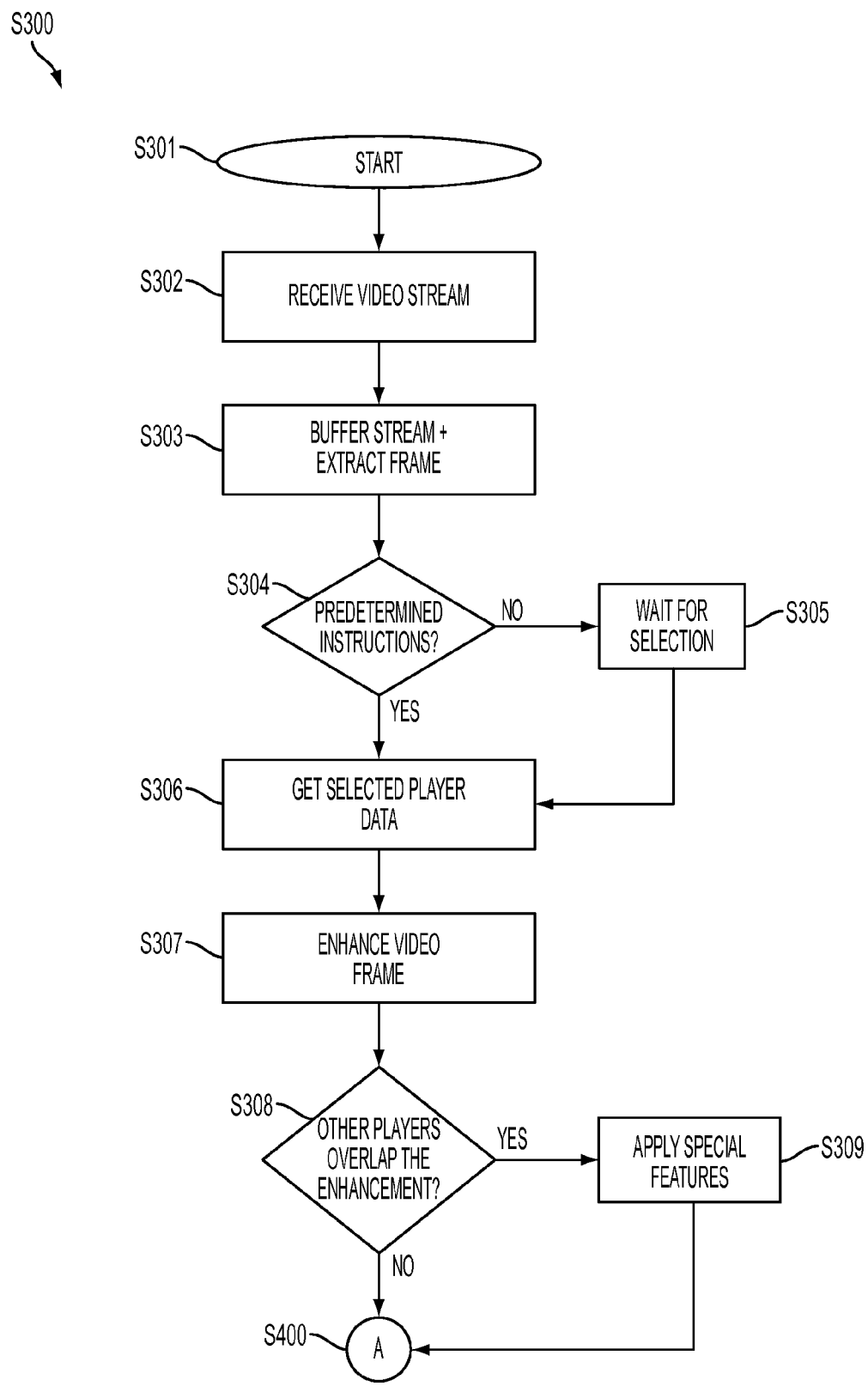
FIG. 3D is a flow diagram of an exemplary method according to exemplary embodiments.
Figure 3E:
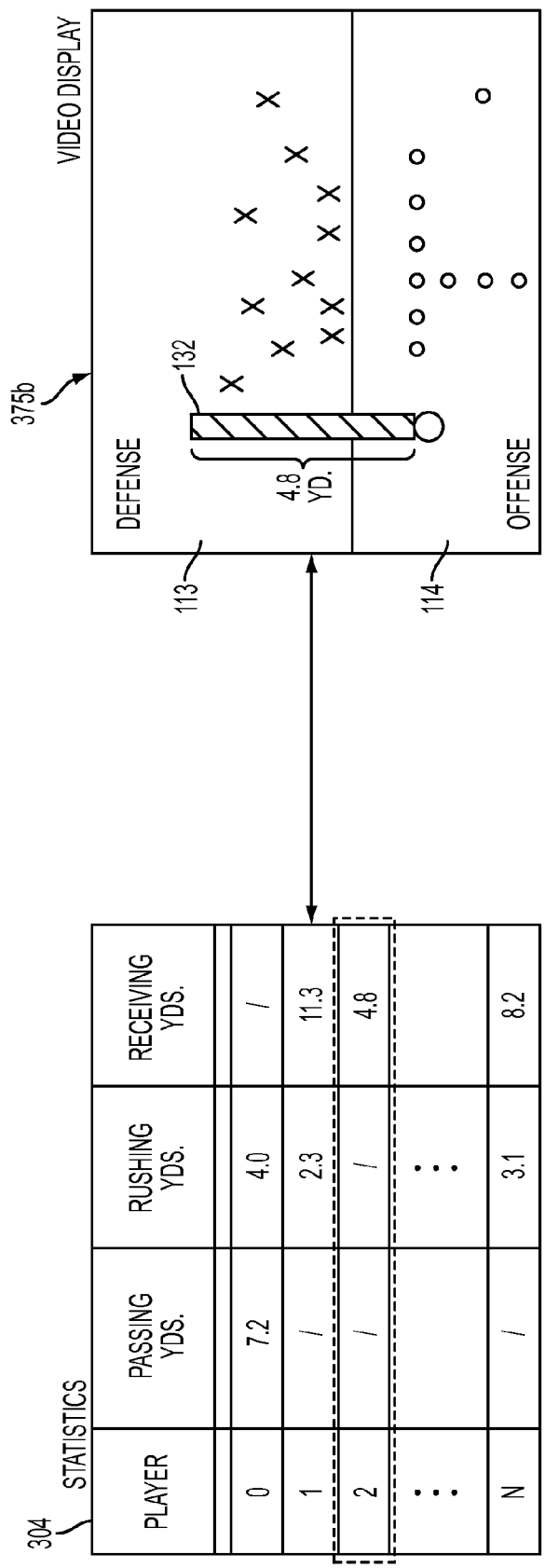
FIG. 3E is a highly simplified illustrative drawing showing a video enhancement device configured and operative according to exemplary embodiments.

The enhancement mixer 290 is configured to apply the enhancement as further discussed with respect to FIGS. 3C-3E.

In the case that the video enhancement device 203 is at the broadcaster-side, the metadata controller 50 may add metadata corresponding to the result of the image analyzer 250 and the result of the processing by the enhancement mixer 290.

In the case that the video enhancement device 203 is at a home, the metadata controller 250 may analyze metadata receive with the video stream 211. The received metadata reduces the processing load of the video enhancement device by reducing the requirements of the image analyzer 250. The received metadata may include information such as player position, enhancement, enhancement position, and other identifiers.

In the case that the video enhancement device is at the broadcasting side, the video enhancement device 203 output of the video stream 301, including the result of enhancing the video stream 211, for broadcasting or otherwise for transmission.

The enhancements 302 may also be output with the video stream 211 for further user review. In the case that the video enhancement device 203 is at a house, the video stream with enhancements 203 is output to a display 211.

FIG. 3B illustrates settings 291. According to example embodiments, these settings may be input by a user and pre-stored, prior to a display of a game, or configured during the display of the game. When these settings are preconfigured, the processing load is reduced as certain enhancements may be retrieved before they become necessary for display.

For example, when a user identifies a certain player upon which enhancements are to be applied, the metrics corresponding to that player may be retrieved and stored in a memory, and when the player is in a position that the enhancement is to be applied, the apparatus does not necessarily locate an external resource because the resource has already been locally stored.

Settings 391 is a GUI including settings such as "All players" 391*a*, "Teams" 391*b*, "Scenarios" 391*c*, "Player position" 391*d*, "Enhancements" 391*c*, "Player Indicator" 391*f*.

"All players" 391*a* allows a user to select and configure enhancement settings from any known user by either scrolling through a list of user names, player numbers, or by searching for a user name or user number.

"Teams" 391*b* allows a user to select and configure enhancement settings from any known team by either scrolling through a list of user teams or by searching for a team name.

"Scenarios" 391*c* allows a user to select and configure enhancement settings by scenarios, such as team X vs. team Y, team position, e.g. arrangement of a team's players on the field before a play, and a score of the game; however, these are merely exemplary embodiments.

"Enhancement" 391*c* allows a user to select and configure any of a shape, color, shade, etc. of enhancements to be applied. The "Enhancement" setting for one player, group, or team may differ from other enhancements displayed at a same time.

"Player indicator" 391*f* allows a user to select indicators to be displayed, at selected or non-selected players, to indicate any of an availability for enhancements to be applied or any other indication desired by the user. Player indicator 391*f* is further described with respect to FIG. 6.

Although some settings have been described with respect to the exemplary embodiment of FIG. 3*b*, it will be understood that other combinations of settings are within the scope of this application.

FIG. 3C is a highly simplified illustrative drawing showing a video enhancement device configured and operative according to exemplary embodiments.

FIG. 3C shows a video device 300*a* including a video enhancement device 120 and a I/O device 210 as well as a representation of a video display of a football game comprising a defensive team 113 and an offensive team 114.

The defensive team 113 comprises a plurality of "X" symbols each of which indicates a respective player of the defensive team. The offensive team 114 comprises a plurality of "O" symbols each of which indicates a respective player of the offensive team.

According to an example embodiment, a player 115 of the offensive team 114 has been selected as a selection 302. As shown in FIG. 3C, a user's finder 309 circles the player in the case where the display is on a touch screen such as a smartTV, smart phone, tablet, etc. According to example embodiments the selection may be made by any other method as suggested herein.

The I/O device 210 is configured to transmit the selection 302 to the video enhancement device 120 to enhance the video stream based on the selection 302. For example, the entire video stream need not be transmitted to the I/O device 210 for user input as the video enhancement device 120 is configured to track the same selected player while providing enhancements corresponding with the player's differential position. Thereby, a processing load is reduced.

FIG. 3E is a highly simplified illustrative drawing showing a video enhancement device configured and operative according to exemplary embodiments.

FIG. 3E shows a video display 300*b* a representation of a football game comprising a defensive team 113 and an offensive team 114.

The statistics 304 represent a table of metrics from which various enhancements could be applied per player. The statistics 304 include Passing Yards, Rushing Yards, and Receiving Yards with respect to each player. The statistics 304 are configurable at any time including real-time updates. According to the examples of FIG. 3A, the statistics are retrieved from external resources; however, the processing load may be further reduced by pre-storing statistics or by receiving a user input of the statistics.

According to the exemplary embodiment of FIG. 3E, player 115 is selected and corresponding metric information 304*a* is retrieved from the table of statistics 304. The selected statistics 304*a* indicate that player 115 has an average of 4.8 Receiving Yards. Accordingly, defensive team 113 and offensive team 114 have an enhancement 132 illustrated as a bar corresponding to 4.8 yards of the field, as represented in the display.

Although FIG. 3D illustrates one enhancement for one player, a plurality of players could be selected for to have various enhancements applied thereto, either from a table of statistics 304 or from some other source such as a network or user input. Further, different colors could be used for the enhancement to clearly distinguish one player from another.

FIG. 3D is a flow diagram of an exemplary method according to exemplary embodiments.

The exemplary method S300 of FIG. 3D may be applied to multiple exemplary embodiments wherein the video enhancement device is utilized. At S301, the video enhancement device is ready to receive a video stream. The processing continues at S302.

At S302, the video enhancement device receives a video stream. The processing continues at S303.

At S303, the video enhancement device buffers the video stream. The processing continues at S304.

At S304, the video enhancement device determines if there are any predetermined instructions for applying an enhancement to the video stream, such as to find a specified player and to apply a corresponding enhancement. If there is a predetermined instruction, the processing continues at S306. If there is not a predetermined instruction, the processing continues at S305.

At S305, the video enhancement device has determined that there was not a predetermined instruction and awaits a user input for instructions. The processing continues at S306.

At S306, the video enhancement device retrieves the selected player data according to either the predetermined instruction or according to the user input. The processing continues at S607.

At S307, the video enhancement device enhanced the video frame with a corresponding metric. The processing continues at S308.

At S308, the video enhancement device determines if other players are interfering with a path or display of the enhancement. For example, in the case that the enhancement is a bar extending from a player, or from a line of scrimmage, and perpendicular to the line of scrimmage, it may be that at least one player, either of a same team or opposing team will be at a position on the field overlapping with the enhancement. If there is no other player interfering with the enhancement, processing continues via connector A, S400, to FIG. 4. If there is another player interfering with the enhancement, processing continues at S309.

At S309, the video enhancement device further enhances the display so that the enhancement does not interfere with the view of the game.

Figure 4:
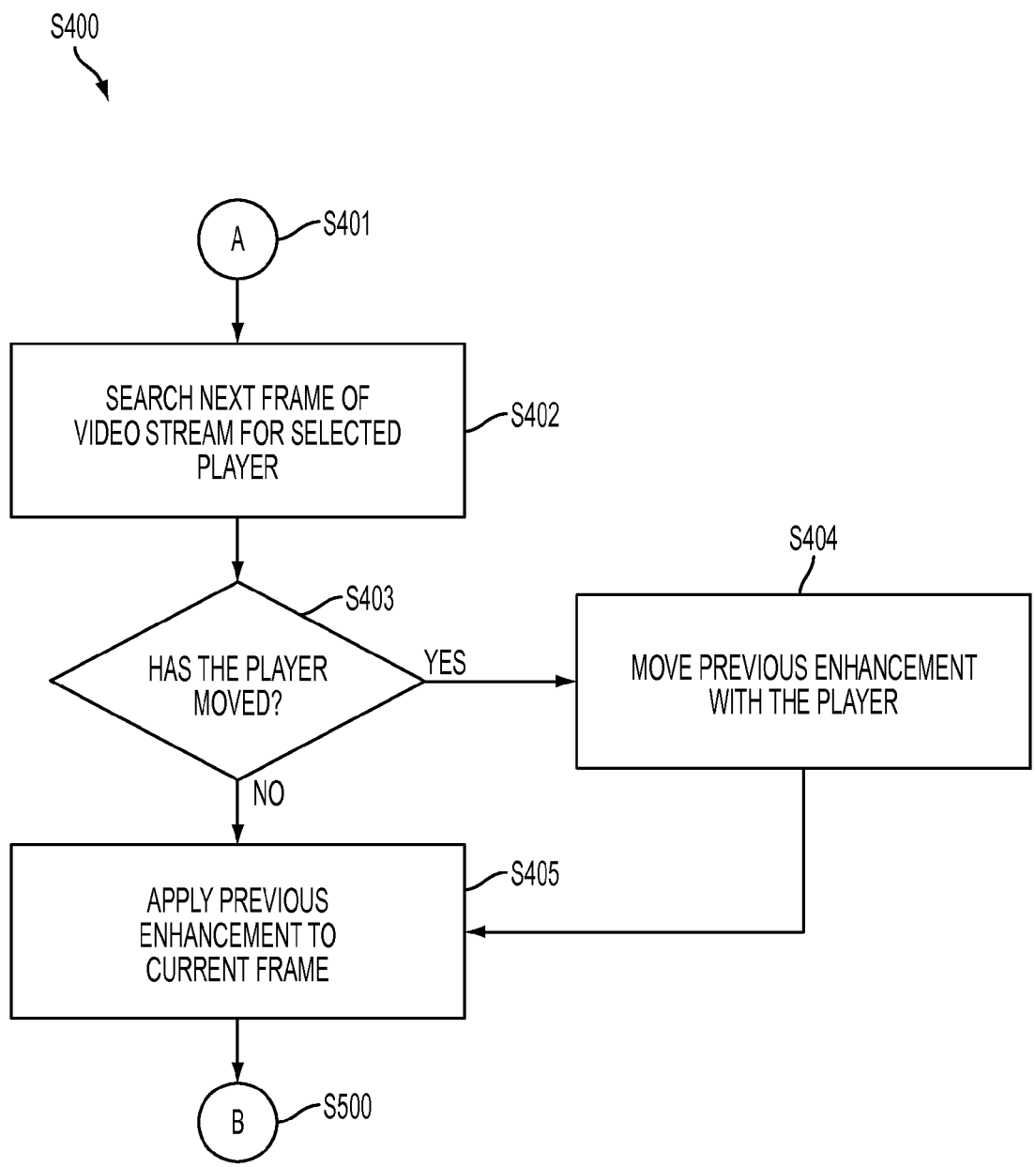
FIG. 4 is a flow diagram according to exemplary embodiments of modifying a video frame using enhancements.

FIG. 4 is a flow diagram of an exemplary method according to exemplary embodiments.

The exemplary method S400 of FIG. 4 may be applied to multiple exemplary embodiments wherein the video enhancement device is utilized. At S401, the video enhancement device has received a video stream and has applied an enhancement to at least one player found in a frame of the video stream. The processing continues at S402.

At S402, the video enhancement device searches a next frame for the selected player. The processing continues at S403.

At S403, the video enhancement device determine if the selected player from the previous frame has moved to a new position. If the selected player has moved, processing continues at S404. If the selected player has not moved, processing continues at S405.

At S404, the video enhancement device has determined that the selected player has moved relative to a previous position of a previous frame and subsequently moves the enhancement to track the movement of the selected player. The processing continues via connector B, S500, to FIG. 5.

At S405, the video enhancement device has determined that the player has not moved relative to a previous position of a previous frame and subsequently maintains the position of the enhancement relative to the selected player. The processing continues via connector B, S500, to FIG. 5.

Figure 5:
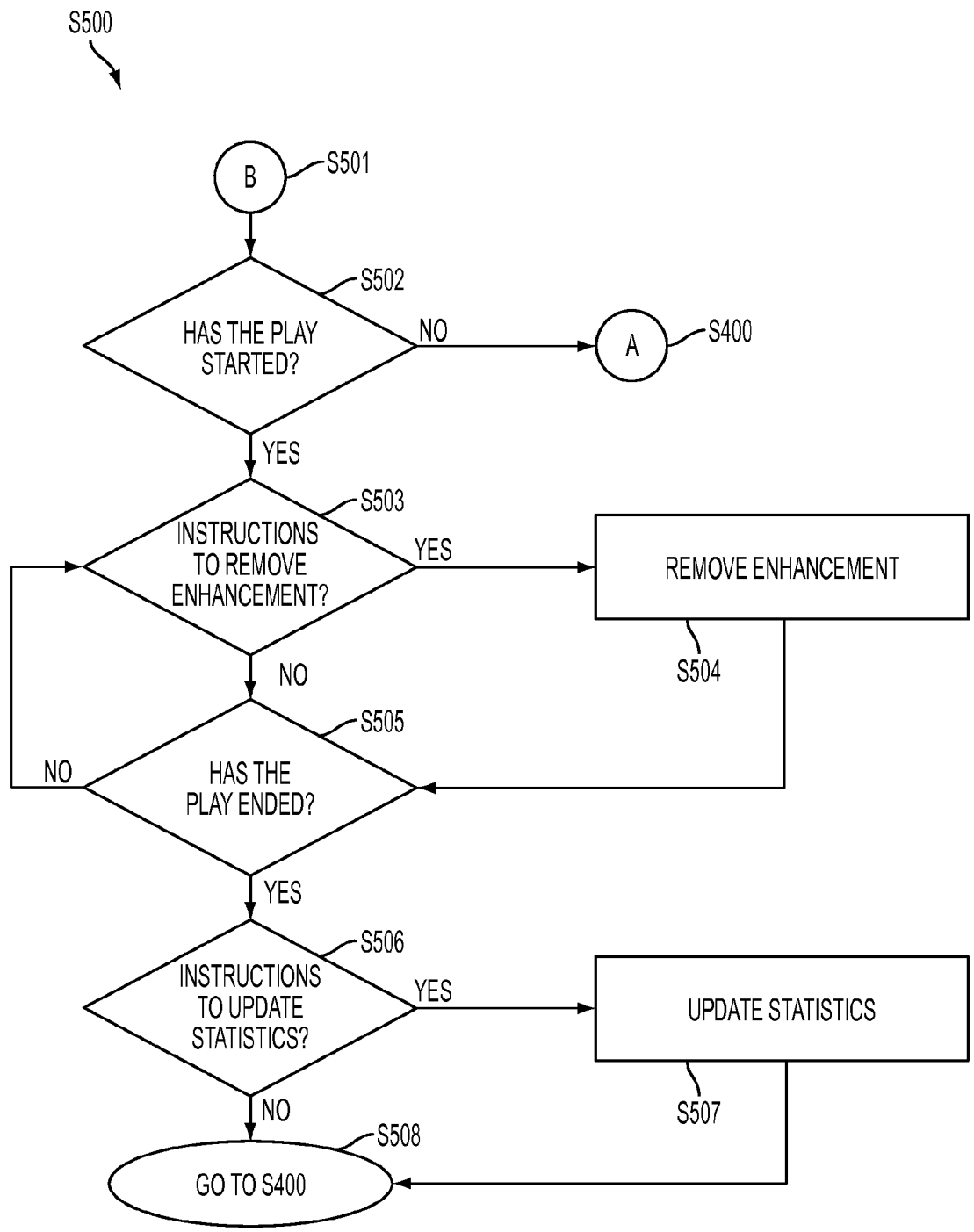
FIG. 5 is a flow diagram according to exemplary embodiments of modifying a subsequent video frame using enhancement.

FIG. 5 is a flow diagram of an exemplary method according to exemplary embodiments.

The exemplary method S500 of FIG. 5 may be applied to multiple exemplary embodiments wherein the video enhancement device is utilized. At S501, the video enhancement device has received a video stream and has applied an enhancement to at least one previous enhancement to a current frame. The processing continues at S502.

At S502, the video enhancement device determines if the play has started. If the play has not started, the processing continues via connector A, at S400. If the play has started, the processing continues at S503.

At S503, the video enhancement device determines if there are instructions to remove the enhancement once the play has started. If there are instructions to remove the enhancement, processing continues at S603. If there are not instructions to remove the enhancement, processing continues at S505.

At S504, the video enhancement device removes the enhancements according to the instructions. Processing continues at S505.

At S505, the video enhancement device determines if the play has ended. If the play is determined to not be ended, processing continues at S503. If the play is determined to be ended, processing continues at S506.

At S506, the video enhancement device determines if there are instructions to update the statistics. If there are instructions to update the statistics, processing continues at S507. If there are not instructions to update the statistics, processing continues at S508.

At S507, the video enhancement device updates the statistics according to a result of the previous play. For example, the statistics could be updated according to the following formula:

$$\text{Statistic} = \frac{(D_{previous} * n) + d_{current}}{n+1};$$

where $D_{previous} = \frac{1}{n}\sum_{i=1}^{n} d_i$ $D_{previous}$ is the previous statistic used by the enhancement, and according to an example embodiment is an average of the sum of the distance gained by a player per play with respect to the number of plays in which the player advanced, and $d_{current}$ is the distance that the player advanced in the current play.

Processing continues at S508.

At S508, the video enhancement device returns processing to S300 of FIG. 3D.

Figure 6:
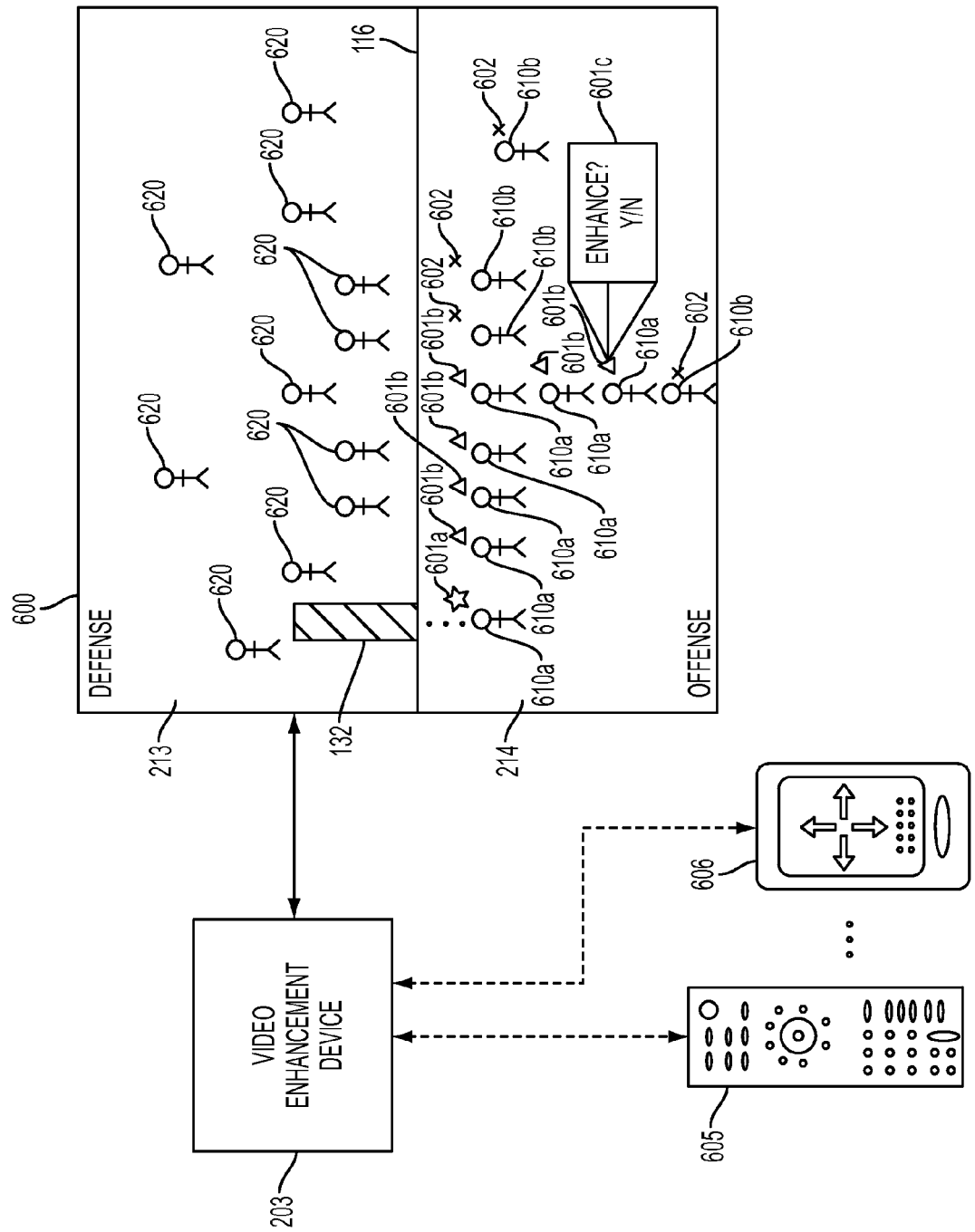
FIG. 6 illustrates a display of players of a football game selectable for enhancement by user input.

FIG. 6 is a view illustrating a video enhancement device and player indicators according to an exemplary embodiment.

FIG. 6 illustrates a display 600, a video enhancement device 203, a remote controller 605 and a smartphone 606.

The display 600 illustrates at least one frame of a football game including an offensive team 214 and a defensive team 213.

The offensive team 214 includes players 610a and 610b. The defensive team 213 includes defensive players 620.

Each player of the offensive team 214 is displayed with a corresponding enhancement, a player indicator. For example, the player indicator 601a indicates that the player has been selected for the display of enhancement 132. The player indicators 601b indicate that the respective players are available to be displayed with additional enhancements. The player indicators 602 indicate that these players are not currently available to be displayed with enhancements; however, the indicators may change as resources become available to the video enhancement device, such as by broadcaster, network, or other user input.

The remote control 605 and smart phone 606 are capable of scrolling through the players, such as jumping from indicator 601a to one of indicators 601b.

As shown in FIG. 6, one of the indicators 601b is selected and a pop-up window 601c is displayed from which a user may select whether to display enhancements for this player. The pop-up window 601c may also contain any other input means by which a user may specify enhancement settings for this player.

Figure 7:
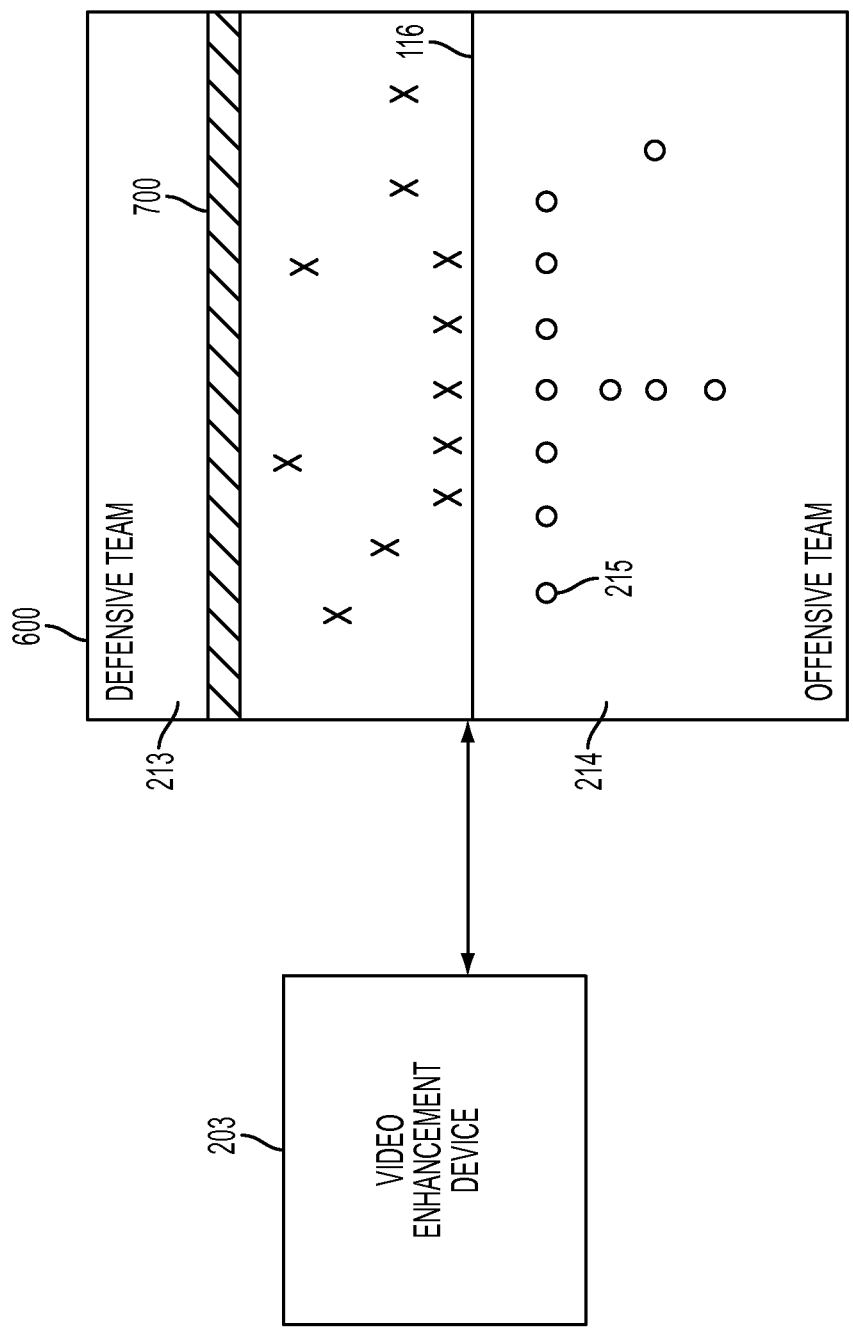
FIG. 7 illustrates a display of another enhancement to a football game.

FIG. 7 illustrates an exemplary embodiment of an enhancement applied to the display of a football game. FIG. 7 shows a video enhancement device 203 and a display 600.

The display 600 displays at least one frame of a football game, including a defensive team 213 and an offensive team 214.

According to an exemplary embodiment, the enhancement 700 is a bar or line parallel to the line of scrimmage 116. The enhancement 700 is a projection, based on statistics of player 215, which illustrations how far player 215 would likely advance the offensive team 214, based on the game-play statistics of player 215.

Although FIG. 7 illustrates that the enhancement 700 is based on a single player, the enhancement 700 may be calculated as an average of team statistics, such as, how far the offensive team 214 is likely to advance based on overall statistics or based on some other user input.

Although above exemplary embodiments are described in a context of a football game, these are provided by way of an example only. The above exemplary embodiment may be applied to other sports.

An exemplary application program interface (API) such as the one depicted in FIG. 6 may be implemented on a computer-readable medium. The term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk., a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or device.

Another form is signal medium and may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc.. or any suitable combination of the foregoing.

Computer program code for carrying out operations for aspects of the exemplary embodiments may be written in any combination of one or more programming languages, including an object oriented programming language such as Java, Smalltalk, C+, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infra-red transmitter to convert the data to an infra-red signal. An infra-red detector can receive the data carried in the infra-red signal and appropriate circuitry can place the data on the data bus. The bus carries the data to the volatile storage, from which processor retrieves and executes the instructions. The instructions received by the volatile memory may optionally be stored on persistent storage device either before or after execution by a processor. The instructions may also be downloaded into the computer platform via Internet using a variety of network data communication protocols well known in the art.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In an exemplary embodiment, such as the one depicted in FIG. 1, statistical video enhancement device may be implemented on a computer-readable medium. The term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or calculator, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or calculator.

Another form is signal medium and may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or calculator.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C++, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infra-red transmitter to convert the data to an infra-red signal. An infra-red detector can receive the data carried in the infra-red signal and appropriate circuitry can place the data on the data bus. The bus carries the data to the volatile storage, from which processor retrieves and executes the instructions. The instructions received by the volatile memory may optionally be stored on persistent storage calculator either before or after execution by a processor. The instructions may also be downloaded into the computer platform via Internet using a variety of network data communication protocols well known in the art.

The corresponding structures, materials, acts, and equivalents of all means or step plus function elements in the claims below are intended to include any structure, material, or acts for performing the function in combination with other claimed elements as specifically claimed.

The description of the exemplary embodiments has been presented for purposes of illustration and description, but is not intended to be exhaustive or limiting in any form. Many modifications and variations will be apparent to those of ordinary skill in the art without departing from the scope and spirit of the invention. Embodiments were chosen and described in order to explain operations and the practical applications thereof, and to enable others of ordinary skill in the art to understand various embodiments with various modifications as are suited to the particular use contemplated. That is, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents thereof.

What is claimed is:

1. An apparatus for virtually applying graphical enhancements, the apparatus comprising:
   a memory configured to store computer-executable instructions; and
   a video enhancement processor configured to execute the stored instructions, which when executed cause the processor to:
      receive at least one image frame of a football game extracted from a real-time multimedia stream, wherein the at least one image frame comprises a plurality of players,
      determine whether at least one predetermined instruction exists for applying a graphical enhancement to the real-time multimedia stream,
      in response to the processor determining that the at least one predetermined instruction exists, determine a type of the graphical enhancement from among a plurality of types of graphical enhancements based on analyzing at least one of the predetermined instruction and pre-stored instructions,
      calculate a graphical enhancement based on historical performance of at least one player from among the plurality of players and based on the determined type of the graphical enhancement to be applied, and
      apply the calculated graphical enhancement to the at least one image frame such that at least one of the players is graphically enhanced,
      determine whether a play has ended,
      in response to the processor determining that a play has ended, updating the graphical enhancement based on progress in the play, and
      applying the updated graphical enhancement to the at least one image frame,
   wherein the graphical enhancement comprises information about projected advancement of a ball in an upcoming play.

2. The apparatus according to claim 1, wherein the graphical enhancement further comprises at least one indicator showing a distance which the one player is projected to advance from a line of scrimmage.

3. The apparatus according to claim 1, wherein the historical performance comprises at least one of an average of said at least one of the one player's passing yards, rushing yards, and receiving yards.

4. The apparatus according to claim 1, wherein the video enhancement processor is further configured to apply the graphical enhancement so as to display a bar indicator above said one player, and
wherein the bar is perpendicular to the line of scrimmage and comprises information about a projected distance advancement.

5. The apparatus according to claim 1, further comprising a user interface configured to receive user input comprising at least one command which selects said one player,
wherein the video enhancement processor is configured to control the memory to buffer the real-time multimedia stream, determine characteristics of the at least one image frame, determine a position of the ball before the upcoming play, and apply the graphical enhancement to the determined position of the ball.

6. The apparatus according to claim 1, wherein the graphical enhancement is applied to a plurality of players using different colors.

7. The apparatus according to claim 1, further comprising:
a user interface configured to receive user input comprising at least one command which modifies the pre-existing graphical enhancement,
wherein in response to the user interface receiving the user input indicating a request to update the historical performance, calculating new historical performance using the following equation:

$$\text{Statistic} = \frac{(D_{previous} * n) + d_{current}}{n+1}, \text{ where } D_{previous} = \frac{1}{n}\sum_{i=1}^{n} d_i$$

where d represents an average of a sum of a distance gained by the at least one player per play with respect to a number of plays in which the at least one player advanced, and $d_{current}$ is the distance that the at least one player advanced in a current play.

8. The apparatus according to claim 1, wherein the video enhancement processor selects an enhancement type based on a format of the multimedia stream, which comprises a plurality of video frames of the game in real time.

9. The apparatus according to claim 1, wherein the video enhancement processor sets the graphical enhancement to be displayed based on an enhancement settings which comprise at least two of: display all players enhancement, display a team enhancement, display at least one scenario enhancement, and display at least one player indicator enhancement.

10. The apparatus according to claim 1, further comprising: a display which displays the graphical enhancement with the multimedia stream of the game,
wherein the processor determines whether the graphical enhancement interferes with the view of the football game and determines a location in subsequent frames of the multimedia stream for the graphical enhancement based on the determination, and
wherein the display displays the subsequent frames with the graphical enhancement at the determined location.

11. A method for virtually applying graphical enhancements, the method comprising:
receiving, by a graphical enhancement apparatus, at least one image frame of a football game extracted from a real-time multimedia stream, wherein the at least one image frame comprises a plurality of players;
determining whether at least one predetermined instruction exists for applying a graphical enhancement to the real-time multimedia stream;
in response to the determining that the at least one predetermined instruction exists, determining a type of the graphical enhancement from among a plurality of types of graphical enhancements based on analyzing at least one of the predetermined instruction and pre-stored instructions;
calculating a graphical enhancement based on historical performance of at least one player from among the plurality of players and based on the determined type of the graphical enhancement to be applied;
applying, by the graphical enhancement apparatus, the calculated graphical enhancement to the at least one image frame such that at least one of the players is graphically enhanced,
determining whether a play has ended;
in response to the determining that a play has ended, updating the graphical enhancement based on progress in the play; and
applying the updated graphical enhancement to the at least one image frame,
wherein the graphical enhancement comprises information about projected advancement of a ball in an upcoming play.

12. The method according to claim 11, wherein
the graphical enhancement further comprises at least one indicator showing a distance which the one player is projected to advance from a line of scrimmage.

13. The method according to claim 11, wherein the historical performance comprises at least one of an average of said at least one of the player's passing yards, rushing yards and receiving yards.

14. The method according to claim 11, further comprising:
applying the graphical enhancement so as to display a bar indicator above said one player,
wherein the bar is perpendicular to the line of scrimmage and comprises information about a projected distance advancement.

15. The method according to claim 11, further comprising:
inputting at least one user command to select said one player.

16. The method according to claim 11, further comprising:
receiving a broadcast comprising said at least one frame wherein broadcast is provided with the graphical enhancement to a plurality of display devices.

17. The method according to claim 11, wherein:
the plurality of types of the graphical enhancement comprise: display all players enhancement type, display a team enhancement type, display at least one scenario enhancement type, and display at least one player indicator enhancement type from among a plurality of players,
the display at least one player indicator enhancement type comprises receiving a user input of a first player and a second player from among the plurality of players and displaying a first indicator for the first player and a second indicator for the second player, and the first and second indicators comprise information about projected distance advancement of the respective player from among the first player and the second player in the upcoming play.

18. The method according to claim 11, further comprising:
receiving an instruction to remove the graphical enhancement during the play, and
in response to the receiving the instruction to remove the graphical enhancement during the play, removing the graphical enhancement from the at least one frame during the play, wherein the graphical enhancement is updated after each of a plurality of plays during the football game.

19. The method according to claim 11, further comprising:
determining a format of the real-time multimedia stream from among a plurality of formats comprising H.264 steaming and MPEG streaming; and
determining a format from among a plurality of formats for the graphical enhancement based on the determined format,
wherein the plurality of formats differ from one another at least based on a number of frames where the enhancement is inserted.

20. The method of claim 19, wherein the number of frames are determined based on a following formula:

$$[N]=(w\%codecs\ rate+w\%bandwidth\ rate+W\%data\ rate+W\%frame\ rate+W\%resolution)/T,\ where:$$

w % is a weight assigned to a respective variable,
codecs rate is a rate of the multimedia stream per time period,
bandwidth is a connection speed,
data rate is a size of the multimedia stream per the time period,
frame rate is frames received in the time period, and
T is a preset threshold value.

21. The method according to claim 11, further comprising:
setting, via a remote controller, at least one of the plurality of types of graphical enhancements; and
storing, in a memory, the set at least one type of enhancement.

22. The method according to claim 11, further comprising:
processing the at least one image frame from the real-time multimedia stream to detect locations of the plurality of players and the ball and to identify the plurality of players and the ball in the at least one image frame; and
applying the graphical enhancement based on the detected locations and the identified plurality of players and the ball.

23. The method according to claim 11, further comprising:
retrieving a user input selection of a player from among the plurality of players in the football game;
determining if the selected player has moved to a new position after the play has ended;
in response to the determining that the selected player has not moved to the new position, maintaining the graphical enhancement at same position in a next image frame extract from a real-time multimedia steam; and
in response to the determining that the selected player has moved to the new position after the play has ended, determining movement of the selected player and moving the graphical enhancement to a new position in the next image frame based on the determined movement.

* * * * *